(12) United States Patent
Lebret et al.

(10) Patent No.: US 8,256,116 B2
(45) Date of Patent: Sep. 4, 2012

(54) METHOD OF USING LASER SHOCK IMPACTS TO PRODUCE RAISED ELEMENTS ON A WALL SURFACE CAPABLE OF BEING SWEPT BY A FLUID IN ORDER TO CONTROL THE INTENSITY OF TURBULENCE IN A TRANSITION ZONE

(75) Inventors: Yann Pascal Raymond Rene Lebret, Maincy (FR); Claude Marcel Mons, Savigny le Temple (FR)

(73) Assignee: SNECMA, Paris (FR)

( * ) Notice: Subject to any disclaimer, the term of this patent is extended or adjusted under 35 U.S.C. 154(b) by 545 days.

(21) Appl. No.: 12/236,839

(22) Filed: Sep. 24, 2008

(65) Prior Publication Data
US 2009/0083979 A1   Apr. 2, 2009

(30) Foreign Application Priority Data
Sep. 24, 2007   (FR) ..................... 07 06675

(51) Int. Cl.
*F01D 5/04*   (2006.01)
*F01D 5/10*   (2006.01)

(52) U.S. Cl. ............ 29/889.7; 29/446; 416/236 R; 416/223 A; 416/241 R

(58) Field of Classification Search ............ 29/889.7, 29/446; 416/244 A, 223 A, 241 R, 236 R, 416/229 A, 228, 224; 72/53
See application file for complete search history.

(56) References Cited

U.S. PATENT DOCUMENTS

| | | | |
|---|---|---|---|
| 4,401,477 A * | 8/1983 | Clauer et al. | 148/525 |
| 4,907,765 A | 3/1990 | Hirschel et al. | |
| 4,994,639 A | 2/1991 | Dickinson et al. | |
| 5,492,447 A * | 2/1996 | Mannava et al. | 415/200 |
| 5,591,009 A * | 1/1997 | Mannava et al. | 416/241 R |
| 5,935,464 A * | 8/1999 | Dulaney et al. | 219/121.65 |
| 6,004,102 A * | 12/1999 | Kuefner et al. | 416/228 |
| 6,021,154 A * | 2/2000 | Unternahrer | 372/108 |
| 6,104,571 A * | 8/2000 | Kabasawa | 360/236.4 |
| 6,144,012 A * | 11/2000 | Dulaney et al. | 219/121.85 |
| 6,238,187 B1 * | 5/2001 | Dulaney et al. | 416/241 R |
| 6,415,486 B1 * | 7/2002 | Prevey, III | 29/90.01 |

(Continued)

FOREIGN PATENT DOCUMENTS
EP   0 626 228 A1   11/1994
(Continued)

OTHER PUBLICATIONS

Melting and Surface Deformation in Pulsed Laser Surface Micormodification on Ni-P Disks, Journal of Heat Transfer, ASME, vol. 122, Feb. 2000, pp. 107-115.*

*Primary Examiner* — David Bryant
*Assistant Examiner* — Jason L Vaughan
(74) *Attorney, Agent, or Firm* — Oblon, Spivak, McClelland, Maier & Neustadt, L.L.P.

(57) ABSTRACT

A method for producing, on the surface of a wall capable of being swept by a fluid, raised elements forming disruptions of the boundary layer is disclosed. The method includes applying laser shocks to the surface so as to create peaks on the edge of the impact zones such that the peaks form the disruptive raised elements.

6 Claims, 2 Drawing Sheets

U.S. PATENT DOCUMENTS

| | | | | |
|---|---|---|---|---|
| 6,479,790 B1* | 11/2002 | Graham et al. | | 219/121.85 |
| 6,511,559 B2* | 1/2003 | Brenner et al. | | 148/639 |
| 6,551,064 B1* | 4/2003 | Mannava et al. | | 416/223 A |
| 6,657,160 B2* | 12/2003 | Hackel et al. | | 219/121.85 |
| 6,752,593 B2* | 6/2004 | Clauer et al. | | 415/200 |
| 6,805,970 B2* | 10/2004 | Hackel et al. | | 428/544 |
| 7,097,720 B2* | 8/2006 | Mannava et al. | | 148/565 |
| 7,137,282 B2* | 11/2006 | Westley et al. | | 72/53 |
| 7,159,425 B2* | 1/2007 | Prevey et al. | | 72/53 |
| 7,226,211 B2* | 6/2007 | Furuta et al. | | 384/100 |
| 7,467,935 B2* | 12/2008 | Betz et al. | | 418/259 |
| 7,582,174 B2* | 9/2009 | Vigneau | | 148/565 |
| 7,718,921 B2* | 5/2010 | Dane et al. | | 219/121.73 |
| 7,723,643 B2* | 5/2010 | Hackel et al. | | 219/121.85 |
| 7,736,450 B2* | 6/2010 | Bailey et al. | | 148/565 |
| 7,750,266 B2* | 7/2010 | Dane et al. | | 219/121.6 |
| 7,851,725 B2* | 12/2010 | Dane et al. | | 219/121.74 |
| 2002/0096503 A1* | 7/2002 | Hackel et al. | | 219/121.85 |
| 2004/0086738 A1* | 5/2004 | Hackel et al. | | 428/544 |
| 2004/0226928 A1* | 11/2004 | Westley et al. | | 219/121.85 |
| 2006/0102602 A1* | 5/2006 | Dane et al. | | 219/121.73 |
| 2006/0102604 A1* | 5/2006 | Dane et al. | | 219/121.74 |
| 2006/0102609 A1* | 5/2006 | Dane et al. | | 219/121.85 |
| 2007/0107807 A1* | 5/2007 | Vigneau | | 148/320 |
| 2007/0221641 A1* | 9/2007 | Hackel et al. | | 219/121.85 |
| 2007/0262063 A1* | 11/2007 | Sano et al. | | 219/121.85 |
| 2008/0078477 A1* | 4/2008 | Bailey et al. | | 148/421 |

FOREIGN PATENT DOCUMENTS

| | | |
|---|---|---|
| EP | 1 752 234 A1 | 2/2007 |
| WO | WO 01/06096 A1 | 1/2001 |
| WO | WO 2004/028731 A1 | 4/2004 |

* cited by examiner

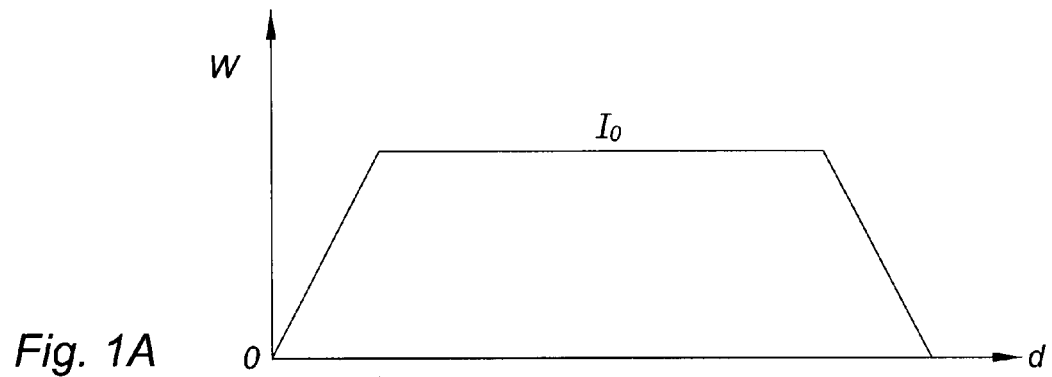
*Fig. 1A*
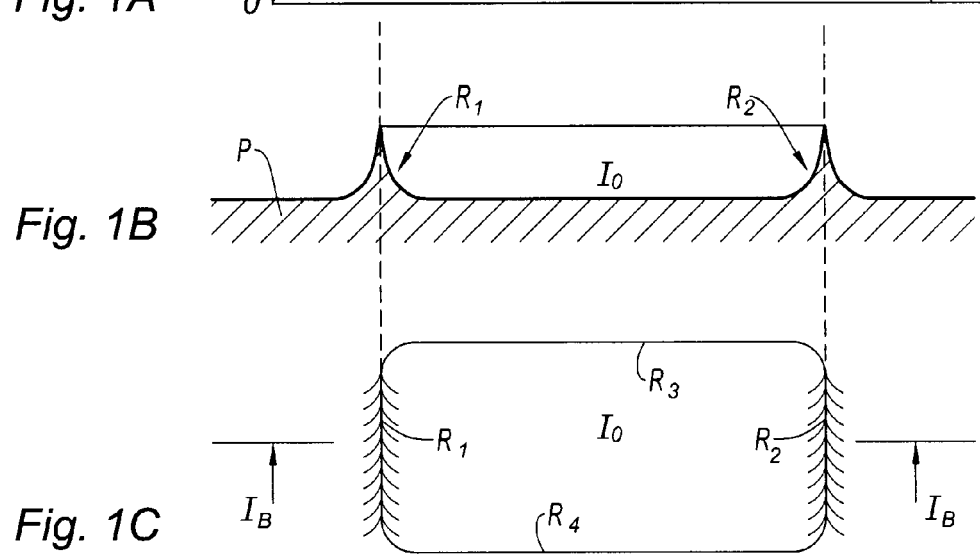
*Fig. 1B*
*Fig. 1C*
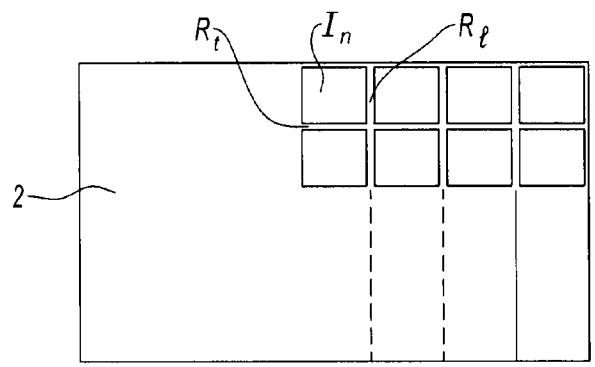
*Fig. 5*

METHOD OF USING LASER SHOCK IMPACTS TO PRODUCE RAISED ELEMENTS ON A WALL SURFACE CAPABLE OF BEING SWEPT BY A FLUID IN ORDER TO CONTROL THE INTENSITY OF TURBULENCE IN A TRANSITION ZONE

BACKGROUND OF THE INVENTION

The present invention relates to the field of turbomachines and is aimed more particularly at a means for improving the flow of fluids along surfaces with an aerodynamic function, such as blades.

DESCRIPTION OF THE PRIOR ART

Studies show that the efficiency of a wing or of a blade is greatly improved by the polishing of its surface but that the organization of the roughness of the leading edge may have a not inconsiderable effect on the separation of the boundary layer on the suction surface. The calculations show that the creation of disruptions organized along the leading edge may, based on a polished state, further improve this efficiency. Tests on the "shark skin" effect have been carried out on aircraft wings and have shown a gain in specific fuel consumption CS of the order of 1%. The "shark skin" is produced from adhesive films of the Mylar® type.

Furthermore, apart from these questions relating to aerodynamism, there is a search to improve the resistance to fatigue of the parts such as the turbomachine blades subjected in operation to great stresses of both a mechanical and thermal nature by the compression of underlying layers on their surface, in particular in the zones close to the leading edge.

A known technique consists in generating this compression by means of laser shocks. The method comprises covering the surfaces to be treated with an ablative coating such as a paint or an adhesive strip and the firing of a laser beam in the direction of the surface thus coated in order to produce the ablation of the covering material by spraying. Shock waves are generated that are the source of the compression of the treated material. The shock wave is confined by a material that covers the ablative coating and is transparent to the laser beam. It is usually a water curtain. The laser must be capable of delivering a power density of the order of 2 to 10 GW/cm$^2$ with pulse durations of the order of 10 to 30 nanoseconds and a shot frequency lying between less than one Hertz and a few Hertz.

The laser shock impacts have a round, square, rectangular or elliptical shape covering a surface area of the order of 1 to 2 mm$^2$ or less. In the known treatment, the impacts are single or repeated several times, three or four times at each point to treat the whole range of depths and gradually reach the expected stress levels. In addition, the treatment of a given surface is carried out with partial overlapping of the impacts so as not to leave surfaces between impacts that have not been treated. Therefore the surface is treated by carrying out a sweep by rows of spaced spots and by reiterating the sweep several times with a slight shift each time in order to reach all the points of the surface. Such a technique combined with a conventional shot blasting is described in patent application EP 1752234 in the name of the applicant. The treatment of a turbomachine blade, and more particularly its leading edge or its trailing edge according to the laser shock technique is also described in patent application EP731184.

These overlaps prevent the formation of dishes at the same level as the impacts. The formation of a dish means the raising of the edges of the dish. Specifically the energy of an impact of a shockwave has a substantially Gaussian or trapezoidal shape. This causes the formation of a microvoid with material being pushed away towards the edges of the impact. The height of the peak bordering the microvoid depends on the energy parameters and the surface of the impact.

Because of the teaching of this prior art, the object of the invention is to produce disruptive raised elements on the surface of walls swept by a fluid for the purpose of improving the aerodynamic efficiency thereof.

SUMMARY OF THE INVENTION

According to the invention, the method for producing, on a wall surface capable of being swept by a fluid, raised elements forming disruptions of the boundary layer in the fluid is characterized in that laser shocks are applied to said surface in order to create peaks on the border of the impacts, the peaks constituting said disruptive raised elements.

Thanks to this method, the fault of the laser shock technique is turned into an advantage. The raised elements in terms of roughness are considered to be undesirable in the technique of compressing a part by laser shocks because it involves conserving a surface state as little disrupted as possible, the objective being the improvement of the mechanical and thermal properties of the part. The raised elements now see their formation promoted in the method of the invention in order to form disruptions of the boundary layer aimed at modifying the behavior thereof: retarding or initiating turbulence depending on the effect sought. The organization of these disruptions may specifically, depending on the rates/pressure and Reynolds numbers, improve the behavior of the boundary layer by preventing it, for example, from separating for very high fluid velocities.

It should be noted that the method of the invention continues to take advantage of the laser shock technique to improve the mechanical and thermal properties of the part.

Based on this basic principle, the application is varied. For example, depending on the requirements, the impacts have a square, rectangular, round or elliptical shape, the geometries of each laser impact furthermore being able to be programmed, thereby allowing the creation of surface and disruptive geometries according to the rate/pressure and film conditions.

The organization of the succession of the impacts is also varied. They may, for example, at least for a portion of them, be adjacent to one another.

It is possible to vary the energy applied according to the impact in order to obtain disruptive raised elements of different heights. The distances between the raised elements may themselves follow mathematical laws for example.

The method of the invention is advantageously applied to the treatment of a wall of a turbomachine blade, notably of a compressor blade of a gas turbine engine.

BRIEF DESCRIPTION OF THE DRAWINGS

Other features and advantages will emerge from the following description of embodiments with reference to the appended drawings wherein:

FIG. 1 represents an example of a single laser shock impact; FIG. 1A is a graph indicating the energy level according to the distance to the part, FIG. 1B shows in section the surface state of the part after an impact and FIG. 1C shows the part seen from above;

FIG. 5 shows an exemplary embodiment of a succession of impacts on a blade profile.

DESCRIPTION OF THE PREFERRED EMBODIMENTS

FIG. 1 is in three parts, 1A, 1B and 1C. The graph of FIG. 1A illustrates the energy variation W on the x axis applied across the impact, the y axis gives the distance d. It can be seen that the energy is uniform and maximal in the central zone of the impact I0. It diminishes progressively when further from the impact. In diagram 1B, which is a section of the part P in the impact zone I0 and shows its surface state, the material is pushed away to the edges of the impact I0 and forms lateral raised elements R1 and R2, seen in section. The height of the raised elements depends on the energy of the shock and the properties of the substrate receiving the laser shock.

In a top view, the shape of the zone deformed by the impact depends on that of the beam, in this instance the shape of the impact is rectangular. The deformed zone has the shape of a dish bordered by four low walls or raised elements R1, R2, R3 and R4.

Figure 2:
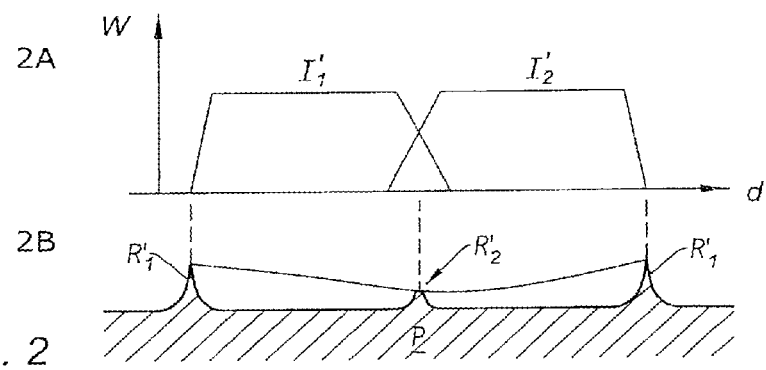
FIG. 2 shows a graph 2A and a section 2B of the part P receiving the impacts, the effect produced by a succession of laser shock impacts.

FIG. 2, like FIG. 1, shows a graph 2A and a section on FIG. 2B of the part P, along the impact zone. It shows the effect of the overlap of two laser shocks I'1 and I'2. The raised elements R'2, in the portion of overlap of the two impacts, are squashed. This overlap is sought for the zones in which a slight roughness and a laminar flow are desired.

Figure 3:
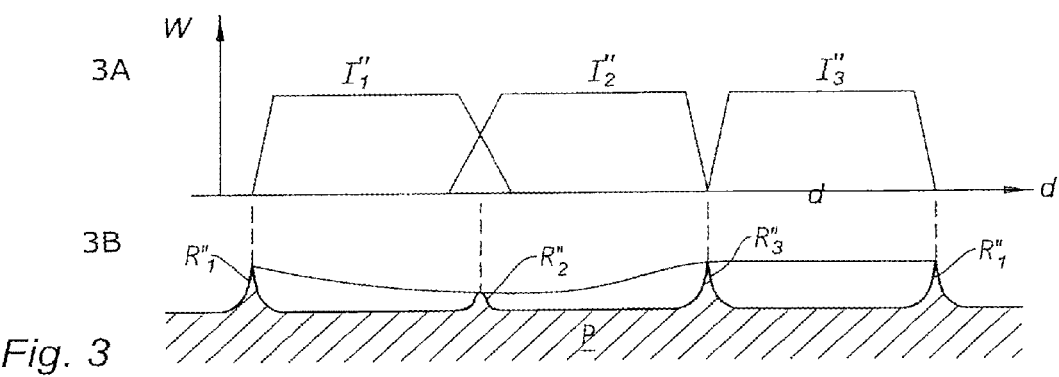
FIG. 3 shows, via a graph 3a and a section of the part P receiving the impacts, the effect produced by another succession of impacts.

FIG. 3, like FIG. 1, shows a graph 3A and a section on FIG. 3B of the part P. The raised elements R"2, R"3, all else being equal, resulting from the overlap of the impacts, may be more or less high depending on whether the shocks I"1, I"2, I"3 overlap more or less partially. Therefore the raised element R"2 results from the overlapping of the two impacts I"1 and I"2 which is more extensive than for the raised element R"3; it is more squashed than the latter.

Figure 4:
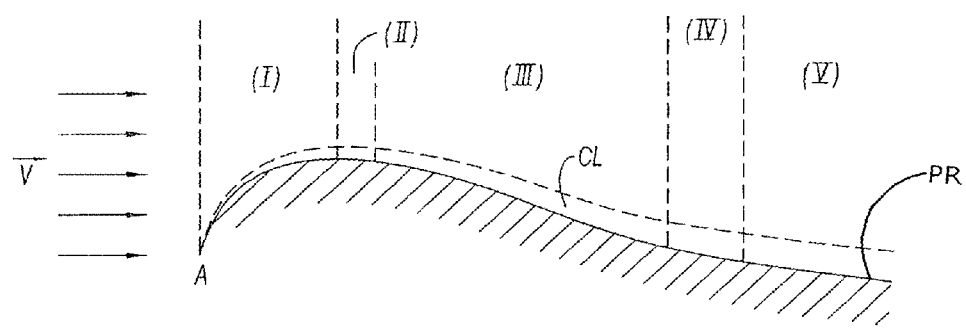
FIG. 4 shows the evolution of the boundary layer of a fluid flow over a wing profile.

The flow of a fluid around a profile PR, of a blade for example, is shown in FIG. 4. It involves the flow along the suction surface of the blade. The fluid approaches the part at a velocity V uniform in height. This velocity is modified along the surface of the profile. In particular, the thickness of the boundary layer CL, whose boundary with the turbulent flow is illustrated by the dashed line, increases from the stop point A on a first portion (I); the boundary layer is laminar (I). Then, in a region of transition (II), it becomes progressively turbulent. Thereafter the boundary layer is turbulent over a portion (III) of the suction surface before separating in the zone (IV) and after this zone forming a turbulent slipstream (V).

The extent of the first portion (I) in which the boundary layer is laminar depends in fact on the state of the roughness of the profile. In the case of a laminar flow, the thickness of the boundary layer is thinner than in a turbulent flow. (The respective Reynolds numbers are Re −0.5 and Re −⅙). There is also a steeper velocity gradient at the wall.

Many theoretical and experimental studies, for example the article by P. A. Krogstad and R. A. Antonia: "Surface roughness effects in a turbulent boundary layer" that appeared in Experiments in Fluids, Vol. 27, 1999, pp. 450-460, Springer verlag—show that for an identical average flow, the roughness of the wall has a strong action on the behavior of the turbulent boundary layer and not only on the viscous layer very close to the wall. The treatment therefore makes it possible to play on two parameters: the position of the transition zone between laminar flow and turbulent, the coefficient of viscosity. Both have an effect on the output of the blade and on the adhesion of the boundary layer.

In other words, through the method of the invention, it is possible:

To arrange a transition zone (II) between the laminar boundary layer and the turbulent boundary layer by creating, in the desired zone on the surface of the part subjected to the flow, flow-disrupting raised elements.

To control as much as possible the position of this zone (II) by placing turbulence-triggering raised elements in the appropriate zones.

To control as much as possible the intensity of the turbulence in this transition zone by the choice:

Of the shape of the surfaces sustaining the laser shocks (impacts of rectangular or other shape), Of the height of the peaks parallel to the leading or trailing edges and Of the distances between peak lines.

FIG. 5 represents very schematically a portion of the airfoil of a blade 2. On the suction surface of this blade, a plurality of impacts In, of rectangular shape, has been made aligned along the chord of the blade on the one hand and parallel to its axis on the other hand. This has formed longitudinal peak lines Rl, and transverse peak lines Rt. The transverse lines Rt have for example less height than the longitudinal peaks Rl, by overlapping of the laser impacts on the height of the blade. In this example, the impacts In are identical, but the method of the invention allows any variant. Therefore the impact zones may, for example, have a surface area that increases as it gets further away on the blade from the trailing (or leading) edge of the blade.

There is claimed:

1. A method for producing, on a wall surface capable of being swept by a fluid, raised elements forming disrupters of the boundary layer, comprising:

identifying a desired transition zone on the wall surface between a laminar boundary layer and a turbulent boundary layer; and applying laser shocks to the transition zone on said surface so as to create peaks on a border of impact zones of said laser shocks, wherein the wall is of a turbomachine blade, wherein the peaks constitute said disruptive raised elements, wherein intensity of turbulence in the transition zone is controlled based on at least one of shape of the impacts, height of the peaks, or distance between laser shocks, wherein said impact zones of said laser shocks present a rectangular shape which are aligned along a chord of the blade and aligned parallel to an axis of the blade, wherein the plurality of impacts present longitudinal peak lines which are parallel to the axis of the blade and transverse peak lines which are parallel to the chord of the blade, and wherein a height of the transverse peak lines is less than a height of the longitudinal peak lines.

2. The method as claimed in claim 1, wherein laser shocks are arranged so that the impacts produced are adjacent or partially overlapping one another.

3. The method as claimed in claim 1, wherein the energy applied is varied according to the impact zone, so as to obtain disruptive raised elements of different heights.

4. The method as claimed in claim 1, wherein the wall is of a compressor blade of a gas turbine engine.

5. The method as claimed in claim 1, wherein laser shocks are arranged so that the impacts produced are partially overlapping resulting in a squashed raised element in order to produce a laminar flow.

6. The method as claimed in claim 1, wherein the laser shocks are applied on a suction side of the blade.

* * * * *